Feb. 28, 1950   C. L. NORDEN   2,499,228
STABILIZATION OF DIRECTIONAL DEVICES
Filed Sept. 25, 1945   4 Sheets-Sheet 2
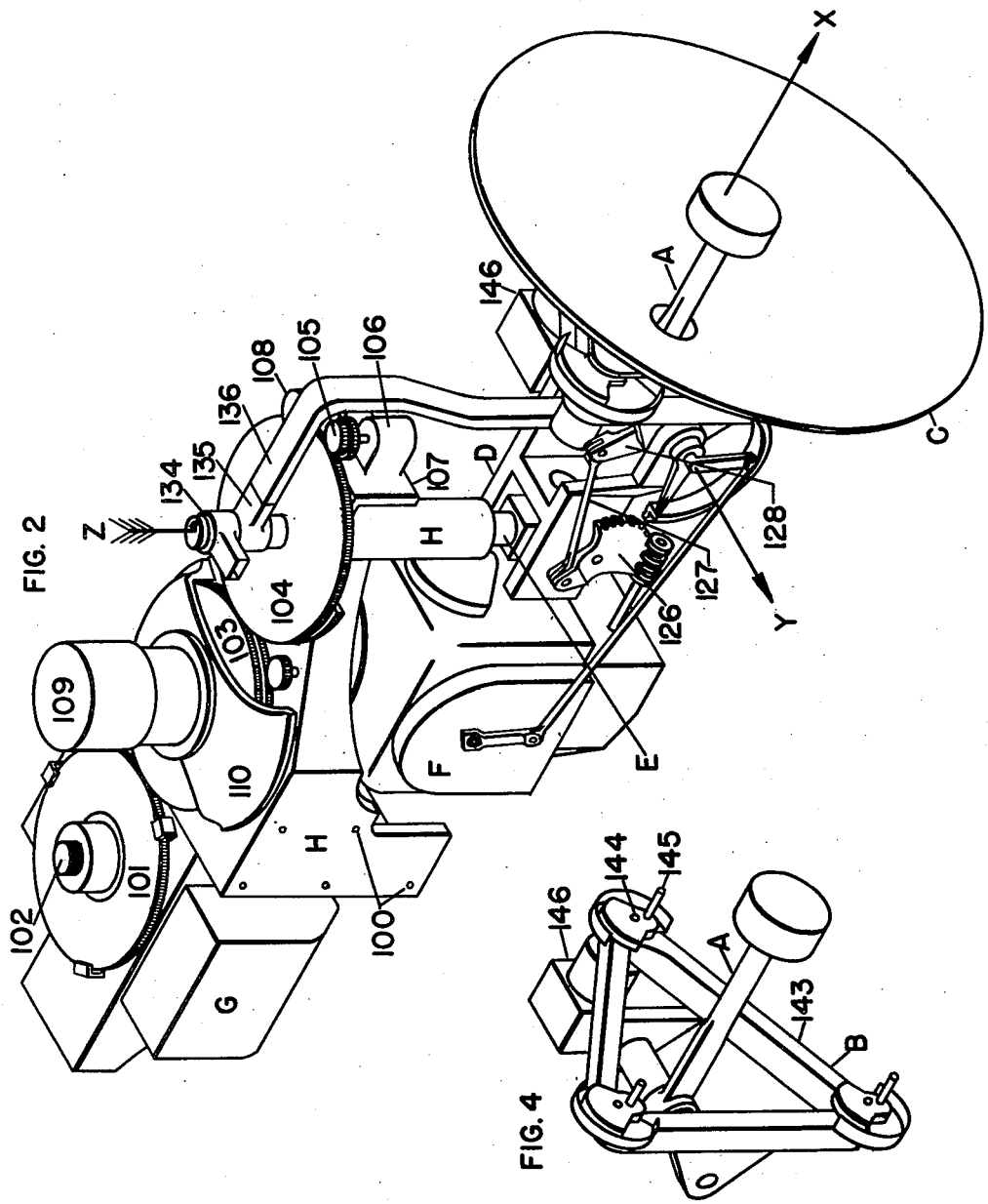
INVENTOR.
Carl L. Norden
BY
Sawyer & Kennedy

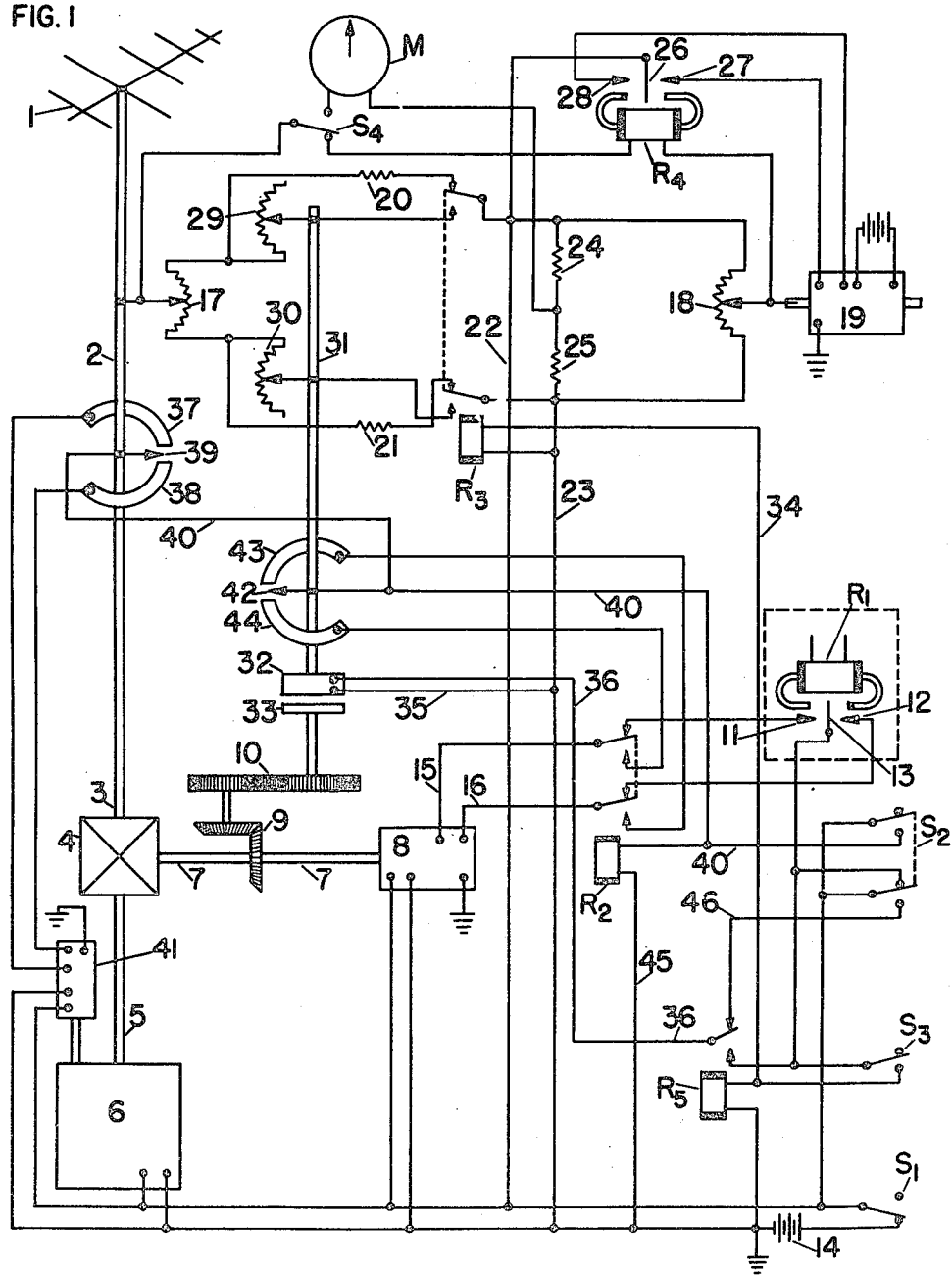

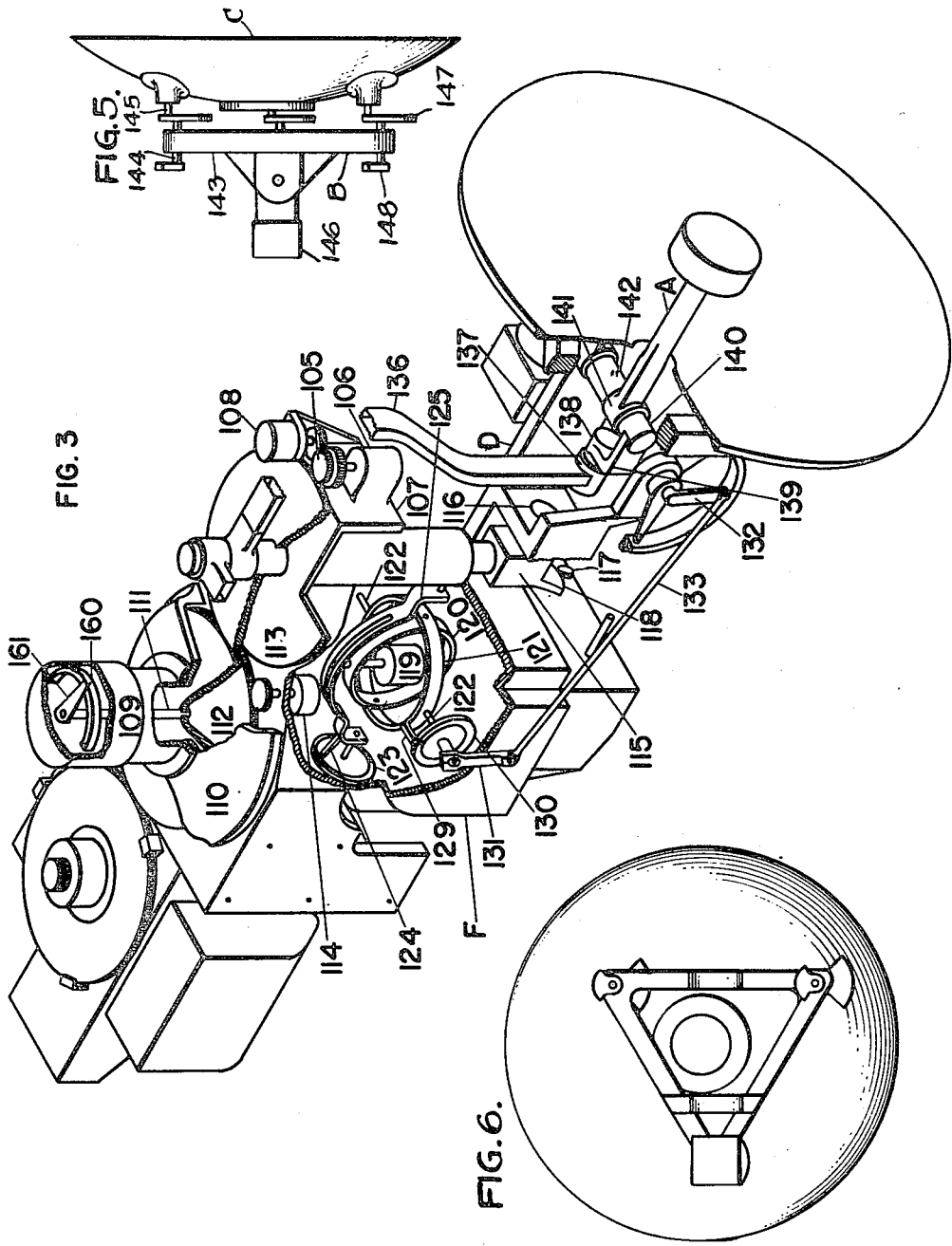

Feb. 28, 1950 — C. L. NORDEN — 2,499,228
STABILIZATION OF DIRECTIONAL DEVICES
Filed Sept. 25, 1945 — 4 Sheets-Sheet 4

INVENTOR.
Carl L. Norden
BY
Hawgen & Kennedy

Patented Feb. 28, 1950

2,499,228

UNITED STATES PATENT OFFICE 2,499,228

STABILIZATION OF DIRECTIONAL DEVICES

Carl L. Norden, New York, N. Y., assignor to The Norden Laboratories Corporation, New York, N. Y., a corporation of Connecticut Application September 25, 1945, Serial No. 618,448

9 Claims. (Cl. 343—117)

This invention relates to improvements in stabilization and control of directional devices.

The general object of the invention is to provide improved means for stabilizing and controlling directional devices such as radar, or other directional equipment, particularly for use in aircraft.

Another object of the invention is to provide apparatus in which efficient mounting and movement of a microwave pipe conductor is achieved in conjunction with provision for various movements of an antenna.

Still another object of the invention is to provide improved mechanism which allows conical scanning of a radar beam while avoiding objectionable vibration and reducing any resultant gyroscopic forces to a minimum.

Still another object of the invention is to provide an improved method of navigation in which a collision course may be computed and established as rapidly as possible and thereafter maintained without sacrificing navigation control while approaching a target or other objective.

Still another object of the invention is to provide equipment of the character indicated adapted for use with existing optical devices such as bomb sights, either as a substitute for or as an addition to optical equipment by coupling the control elements thereto.

With these and other objects which will appear in the following full description in mind, the invention consists in the combinations and arrangements of parts, details of construction and methods of navigation which will now first be fully described in connection with the accompanying drawing and then pointed out more particularly in the appended claims.

In the drawing:

Figure 1 is a circuit diagram and schematic drawing of a radar antenna and stabilization and control system embodying the invention in a preferred form;

Figure 2 is a perspective view of stabilization and control apparatus for a radar antenna of horn and reflector type, and embodying the invention in another preferred form;

Figure 3 is a view similar to Figure 2, but with parts removed and broken away to reveal further details of construction;

Figure 4 is a detail view of the antenna horn and reflector mounting frame in the same orientation as in Figure 2, but removed from associated parts in order to reveal the construction clearly;

Figure 5 is a side elevation of the parts of Figure 4 but showing also the antenna reflector in position thereon, and is taken in the direction of the arrow Y of Figure 2;

Figure 6 is a rear elevation of the mechanism of Figure 5; and

Figure 7:
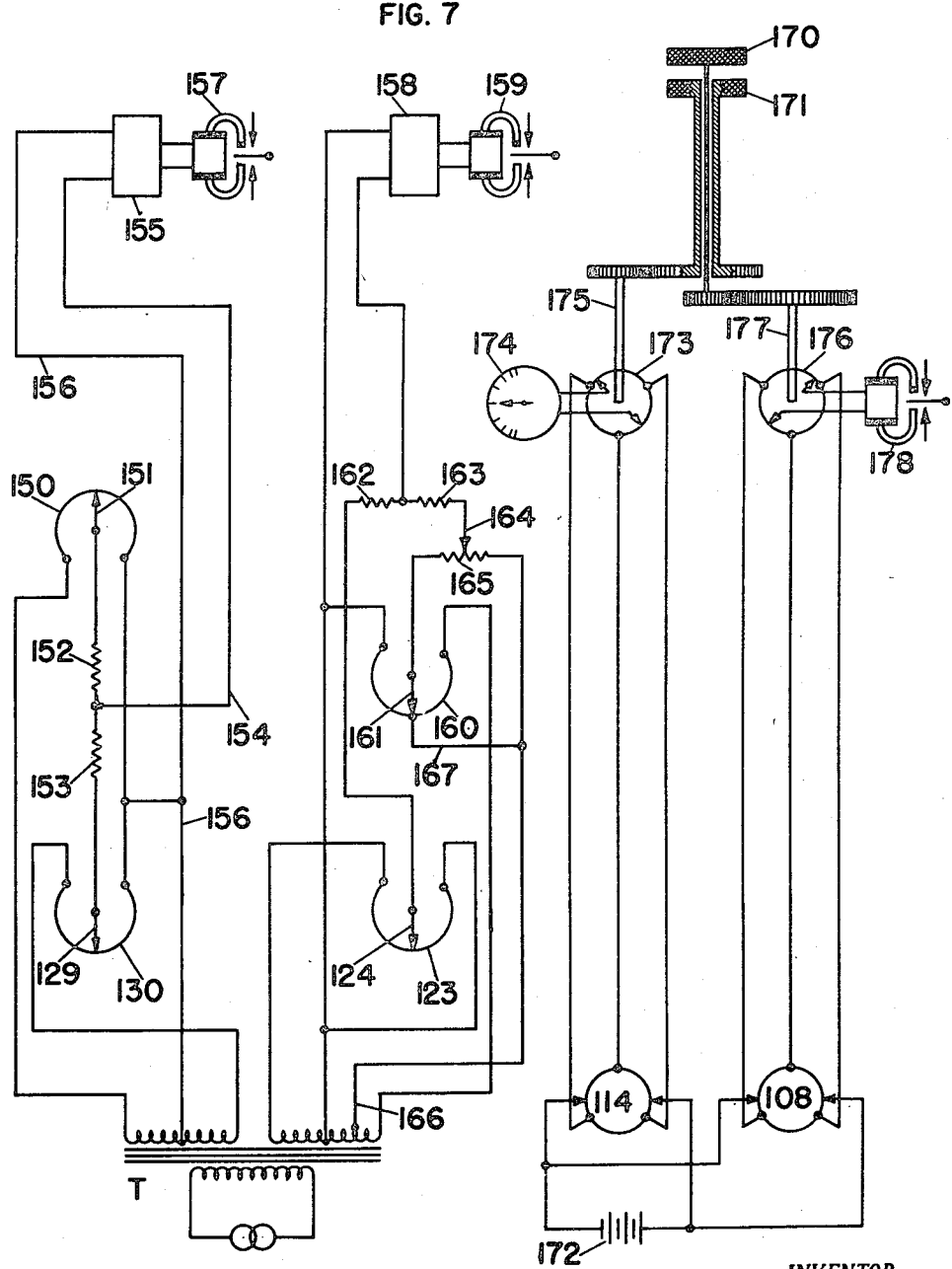
Figure 7 is a circuit diagram showing the circuits utilized in controlling the apparatus of Figure 2.

In Figure 1 of the drawing there is shown schematically a system embodying the invention in a preferred form, as applied to azimuth stabilization and control of a directional antenna. While the system will normally be a so-called "radar" system in which the equipment transmits a suitably modulated beam and receives the reflection thereof, such features form, in themselves, no part of the present invention, which is applicable to other directional equipment such, for example, as directional radio receiving antennas or directional devices responsive to the earth's magnetic field. In the particular embodiment shown, the stabilization is direct, the antenna I being carried by a generally vertical shaft 2, rotatably mounted in suitable bearings (not shown) whose lower end 3 is in driven relation to one side of a differential 4, shown symbolically in the drawing. The other side of the differential 4 is in driven relation to azimuth stabilized shaft 5 of the azimuth gyro 6. A gyro of the type shown in Barth application, Serial No. 331,479, Patent No. 2,485,953 granted October 25, 1949, is suitable, and as will be understood, the shaft 5 is stabilized in azimuth in a "platform" or plane which is fixed with relation to the aircraft, apart from the shaft rotations provided for, resulting in a very simple and reliable method of stabilization. The antenna shaft 2, being perpendicular to the stabilization platform of the azimuth gyro, may not, at any given time, be precisely vertical.

The center or cross-head member of the differential 4 is driven through shaft 7 by the servomotor 8, which may be of any convenient type, such a servo as is shown in the Barth application, referred to above, being suitable. Rotation of shaft 7, shaft 5 being held by the azimuth gyro, will accordingly rotate the shaft 2 and thus turn the antenna I. Conversely, if the aircraft turns, servo 8 being stationary, the apparent effect will be a rotation of shaft 5 (actually stationary with respect to the earth) causing a corresponding rotation of the antenna I with respect to the aircraft and maintaining fixed antenna azimuth with respect to the earth. Through bevel gear pair 9 and spur gear pair 10, rotation of the shaft 7, in addition to turning the antenna 1 also establishes the amount of aircraft turn, as later described in detail.

The output of the radar equipment is indicated schematically by the reference character $R_1$, as comprising a two way relay having contacts 11 and 12 and an armature 13. This device may be operated by any mechanism or circuit capable of indicating that the antenna 1 is not orientated directly toward the target or in the desired direction and capable of indicating the direction of deviation, so that armature 13 comes against contact 11 or contact 12, depending on the direction of deviation of the antenna 1. Such circuit and mechanism, in themselves, form no part of the present invention and will not be further described. Assuming, for example, that armature 13 is against contact 11, and that all switches are in the positions shown in the figure, connection is established from the voltage source 14 through on-off switch $S_1$, centering switch $S_2$, armature 13, contact 11, centering relay $R_2$ and line 15 to the servo 8, causing the servo to drive shaft 7 to rotate the antenna shaft 2 so as to correct the azimuth position of the antenna 1. Closing of the armature 13 against contact 12 establishes a similar circuit terminating in line 16 leading to the servo 8 and actuating the servo in the reverse direction. In this way, the antenna is caused to turn in the one direction or the other and is kept pointed at the target or in the desired direction. A neutral position of armature 13 indicates proper antenna azimuth and no change is produced.

With the switch $S_3$ set as indicated in the figure, a homing course will be provided for, the aircraft following the antenna so as to head toward the target or in the assigned direction. This is accomplished by means of the follow-up system comprising the potentiometers 17 and 18 and associated elements, which actuate a servo 19 to control the aircraft automatic pilot, which may be of any convenient type. The brush of potentiometers 17 is driven by shaft 2 and its position upon its resistor sector accordingly indicates the antenna bearing with relation to the aircraft. This resistor sector is connected through resistors 20 and 21 and relay $R_3$ to the resistor sector of potentiometer 18, the brush of which is driven by servo 19. These elements form the sides of a Wheatstone bridge, one diagonal of which comprises the switch $S_4$ and winding of relay $R_4$ and the other diagonal of which comprises connection 22, switch $S_1$ and voltage source 14, and ground connection 23. Resistors 24 and 25 which are also included in the latter diagonal, in parallel with the voltage source 14, are provided for use during manual operation, when switch $S_4$ is closed in the upper position. With the switch $S_4$ in the lower position, as in the drawing, displacement of the brush of potentiometer 17 due to turning of the antenna shaft 2 relative to the aircraft will energize relay $R_4$, bringing its armature 26 against contact 27 or contact 28, thus actuating the servo 19. Resulting movement of the servo 19 will continue until the brush of potentiometer 18 has moved into a position corresponding to that of potentiometer 17, rebalancing the bridge and causing the aircraft to turn and follow the antenna. The aircraft movement, however, also rotates the resistor sector of potentiometer 17, back-tracking the brush of this potentiometer toward centered position, and the brush of potentiometer 18 follows this movement so that servo 19 turns the aircraft through the same angle as the antenna and the bridge circuit is restored to balance with both potentiometer brushes in centered position and the automatic pilot set for straight flight.

Under the foregoing conditions, therefore, the aircraft follows a homing course. If the target, or point at which the antenna and aircraft are headed, is stationary and there is no drift due to cross wind, the aircraft course will be a straight line. If the target has a transverse component of motion, the aircraft course will be curved, with the curvature decreasing and the aircraft moving asymptotically into a course directly following the target. Drift due to cross wind has the same effect as transverse target movement, resulting in a similar curved homing course.

Where a navigation or collision course is desired, means is provided for causing the aircraft, in response to a turn of the antenna through a given angle, to turn through a greater angle so that the aircraft may be brought into a straight course headed directly toward the target or toward a collision point, depending on whether transverse components of drift or target movement exist. This action involves a modification of the bridge circuit which provides for an effective movement of the brush of potentiometer 18, in response to a movement of the brush of potentiometer 17, which is a multiple thereof. Energizing the relay $R_3$ substitutes for the resistors 20 and 21 the variable resistors 29 and 30, the brushes of which are carried on a shaft 31 which is rotated through magnetic clutch 32, 33 and gearing 9 and 10 by shaft 7, previously referred to. The relay $R_3$ is controlled by switch $S_3$, closing which establishes connection of the winding thereof through line 34, switch $S_3$, centering switch $S_2$ and on-off switch $S_1$ to the voltage source 14, the circuit being completed through line 23 previously referred to. At the same time, the closing of switch $S_3$ energizes relay $R_5$ which, in turn, energizes magnetic clutch 32, circuit for which element is established through lines 23, 35 and 36, relay $R_5$ and switches $S_2$ and $S_1$. With switch $S_3$ closed, rotation of shaft 7 by servo 8, in addition to turning the antenna shaft 2, will, therefore, also turn the shaft 31, thus increasing the resistance of one of the variable resistors 29 and 30 and correspondingly decreasing that of the other. Assuming for simplicity of illustration, gear ratios and potentiometer characteristics such that the change of resistance thus produced in each of the variable resistors 29 and 30 equals the resistance of the arc traversed by the brush of potentiometer 17, and noting that the resistors 29 and 30 are so connected as to increase the resistance in the side of the bridge in which more resistance is being introduced by the movement of brush 17, it will be apparent that the movement of the brush of potentiometer 18 which is required to balance the bridge will be double that of the brush 17 so that the amount of turn of the aircraft will be double that which is imparted to the antenna by shaft 2. As a result, the antenna will be brought into a position properly orientated toward the target while the plane is on a course at an angle thereto. As will be clear from a consideration of the movements of an aircraft and a target which are proceeding at constant speeds along straight line courses, a navigation or straight line collision course of the aircraft implies a constant angle or "drift" angle between the aircraft course and the bearing of the target with relation thereto. Until a flight path is achieved in which the antenna is orientated with respect to the aircraft at this angle and the aircraft is proceeding on a proper course, the aircraft movement in line of flight will cause the antenna to deviate in one direction or the other, thus unbalancing the potentiometers in the bridge circuit and energizing the servos 8 and 19 to alter the antenna and aircraft directions until the proper headings are set up.

The device, when set for a navigation course, will accordingly adjust the antenna position and aircraft flight by a trial and error process, gradually bringing the aircraft into straight line flight on a collision course with the antenna at a proper drift angle to the flight path. The precise manner in which this is accomplished and the rapidity with which the navigation course is attained will depend upon the sensitivity of the antenna and directional equipment and the lags in the control system and in the aircraft response, it being clear that a directional antenna control which will respond to a smaller angular deviation will produce more frequent action and a quicker attainment of desired course. So long as the ratio of movement of the aircraft to that of the antenna, or turndrift ratio, is kept below the limit beyond which hunting is caused, this ratio is not critical. If set too high, hunting may result, particularly as the target is approached. When the aircraft is close to the target, however, a homing course and a navigation course differ very slightly from one another and the course may be changed to a homing course at a suitable point by means of switch S₃, if desired. Where different ratios of aircraft turn to antenna turn are desired for different aircraft or for different conditions of service, they may readily be provided for, as by means of utilizing gearing 10 having suitable different drive ratios or by introducing adjustable resistance components in the bridge circuit. When the navigation method described below is utilized, high drift-turn ratio is unnecessary and a collision course may be attained quickly, while using a constant turn-drift ratio of a value such that objectionable hunting will not occur as the target is approached.

The system provides also for manual control by the pilot. When such control is desired, switch S₄ is shifted to the upper position of the figure, thus cutting out the relay R₄ and eliminating control of the aircraft by servo 19. The meter or pilot director indicator M then forms a diagonal of the Wheatstone bridge, one side of the meter being connected between resistors 24 and 25 so as to be maintained at half the voltage of voltage source 14 and the other being connected to the brush of potentiometer 17. The meter will accordingly indicate the amount of turn required to the right or to the left and such turn may be made by the pilot or may be signaled to the pilot by the operator, if preferred in the case of bombing runs. It will be noted that with the manual control, a homing course indication or a navigation course indication of the indicator M may be obtained as desired by use of the switch S₃, as in the case of the automatic operation.

Centering means for the shafts 2 and 31 are provided. In the case of the shaft 2, this means includes stationary contact sectors 37 and 38 cooperating with a brush 39 which moves with the shaft 2. If the centering switch S₂ is thrown into the lower position of the figure so as to center the apparatus, connection is established through switch S₁ and S₂ and through line 40 to the brush 39. Motion of this brush to either side of the dead spot brings it against contact 37 or 38 thus connecting servo 41 to the voltage source 14 and causing it to precess the azimuth gyro 6 in one direction or the other according to which of the contact sectors 37 or 38 is engaged by the brush 39. Shaft 7 being stationary, the azimuth gyro 6, through shaft 5 and the differential 4, will proceed to rotate shaft 2 so as to bring brush 39 back to the dead spot, thus centering the antenna 1. Throwing switch S₂ likewise connects brush 42, which rotates with the shaft 31, to the voltage source 14. This brush, when it moves to either side of the dead spot position indicated in the figure, engages the one or the other of the stationary contact sectors 43 and 44 and thus, through the relay R₂, energizes the servo 8 through connection 15 or connection 16 and causes it, through shaft 7, gearing 9 and 10 and magnetic clutch 32, 33 to bring the shaft 31 into position where the brush 42 is on the dead spot. The connection for relay R₂ which provides for this action is established from switch S₂, throwing which energizes the winding of relay R², the circuit therefor being established from voltage source 14 through switch S₁, switch S₂, connection 40 and connection 45 and causing the armatures of relay R₂ to make contact with the lower contacts of the figure. During the centering action, the magnetic clutch 32, 33 is energized by reason of the fact that connection thereto to the voltage source 14 is established, when the armature of relay R₅ is in the upper position as shown in the drawing, through line 36, line 46, switch S₂ (which is now in the lower position) and through switch S₁. The armature of relay R₅ will be in the upper position since the energizing path therefor from switch S₃ passes through switch S₂ and is broken by the throwing of this switch to the lower position. The centering of the shaft 31, as described, is direct and is not affected by the movement of shaft 2. Shaft 2, however, will be rotated by the precession of the azimuth gyro 6 and the rotation of shaft 7 so as to bring shaft 2 into centered position and, as the shaft 7 ceases its movement, shaft 2 will become stationary in centered position. When these shafts are centered, the antenna 1 will be pointed dead ahead and the variable resistors 29 and 30 will be in centered or equal resistance position. The parts being thus centered, the operator throws switch S₂, putting the system into operation for either manual or automatic homing or collision course according to the setting of the other switches described above.

Where desired, the antenna may be stabilized remotely instead of directly and where servo motor mechanism of the type referred to is utilized, this requires no more than a bridge circuit of the type already disclosed for other purposes in the present description, and serving to control the antenna azimuth with relation to a potentiometer driven by the differential 4.

In the embodiment of Figures 2 to 7 inclusive, the apparatus provides for stabilization and control of an antenna in elevation, roll and azimuth. In addition, a movement of the antenna reflector with relation to the antenna feed horn is provided, so as to produce conical scanning of the radar beam. Referring to Figures 2 and 3, the antenna comprises a feed horn A attached rigidly to a frame structure B (Figure 4) which is mounted for pivotal movement about a level axis Y. The antenna reflector C is likewise carried by the frame structure B but has a scanning movement with relation thereto, as more fully described below. An H-frame D, which carries the antenna structure previously referred to, is mounted for rotation about a cross-level axis X and is supported by a vertical post E which, in turn, is rotatable about a yaw axis Z. The movement of the antenna assembly about the level axis Y and also the movement of the H-frame D about the cross-level axis X are referred to a vertical gyro unit F carried by the other end of the H-frame D and are controlled by servos, while the rotation of the post E about the yaw axis Z is referred to an azimuth gyro unit G. The azimuth gyro G and post E are carried by a main frame structure H which also supports suitable mechanism for maintaining the post E and equipment carried thereby fixed with relation to the azimuth gyro G, or for varying the azimuth angle when desired. The whole structure of Figure 2 may be mounted in any desired location within an aircraft and in any convenient way, as by affixing the frame H to aircraft structural parts at locations such as indicated by the screw holes 100. Where a wing location or other restricted space is preferred for the antenna itself, remote stabilization may be utilized, but direct stabilization is preferred where the antenna location permits.

The azimuth gyro unit G may be of the type disclosed in Barth application, Serial No. 331,479, and has an output gear 101 which is stabilized in azmuth. The gear 101 will accordingly maintain fixed azimuth in a platform which is fixed with relation to the aircraft and which platform will generally be horizontal, or approximately so. Means such as the clutch knob 102 may be provided for disconnecting gear 101 from the azimuth gyro, when desired. Gear 101, through intermediate idle gear 103, meshes with gear 104 which is rotatably carried on the post E and meshes with a gear 105 fixed to the shaft of a servo 106 which, in turn, is carried by a member 107 fastened to the post E. Actuation of the servo 106 will accordingly rotate the member 107 and the post E and structure supported thereby with reference to the azimuth gyro G, while, if this servo is stationary, the post E will remain fixed in azimuth with relation to the gear 101.

Three potentiometers as associated with the gearing referred to. The turn follow up potentiometer 108 is geared to the output of servo 106 (Figure 3) and accordingly registers angular movement of the post E with relation to the azimuth gyro. A drift angle potentiometer 160, 161 for cross trail control is carried within the housing 109 which, in turn, is carried by a member 110 mounted on main frame H. Potentiometer drive shaft 111 is driven by gear 112 in mesh with a gear section 113 formed on the member 107. The angle between shaft 111 and housing 109 thus equals the drift angle, or angle between post E and the main frame H. The third or drift follow up potentiometer 114 is carried by the main frame H and driven by gear 112 and is so connected in the circuit shown in Figure 7 that it registers the differential angular movement of the post E relative to the aircraft. By means of the circuit arrangement shown in Figure 7 and later described in detail, the foregoing gearing and potentiometers are utilized to control the antenna relative to the yaw axis Z, and also with relation to the cross-level axis X. Still further devices may be included, such as means for imparting scanning movement about the yaw axis to the antenna and follow ups therefor may be included in the housing 109. Such devices, however, are not essential to the present invention and accordingly are not described.

Movement of post E will rotate the axial system X–Y about the axis Z, and the cross-level and level, or elevation movements, about to be described, are referred to the axial system X—Y in whatever position is determined by such movement of the post E. As shown most clearly in Figure 3, the post E terminates in a block 115 upon which the H-frame D is pivotally mounted by a shaft 116. The housing of vertical gyro unit F is rigid with the frame D and contains a servo having an output gear 117 in mesh with a gear sector 118 formed with the block 115 and concentric about the axis of the shaft 116. Rotation of the gear 117 will accordingly rock the whole H-frame about the cross-level or X axis.

The vertical gyro parts are indicated schematically in Figure 3 and comprise a vertical rotor 19 carried in an inner gimbal or rotor housing 120 which, in turn, is carried in an outer gimbal or cardan 121 pivotally supported on a level or elevation axis by trunnions or gudgeons 122. The spin axis of this gyro will normally be maintained vertical by suitable erecting devices, not shown. A potentiometer sector 123 carried by the gyro housing F and cooperating with a brush 124 which is carried by a bail 125, pivotally carried by the housing F for rotation about a cross-level axis, indicates motion of the H-frame D with reference to the bail 125 and permits control thereof through the servo driven gear 117, as previously described.

As shown in Figure 2, the angular position of the antenna assembly about the elevation or level axis Y is controlled by a second servo within the vertical gyro housing, which through worm and sector gearing 126, link 127 and arm 128 regulates the position of the antenna assembly about the Y axis. This servo is controlled with reference to the vertical gyro by means of potentiometer brush 129 (Figure 3) carried by the cardan 121 and cooperating with a potentiometer sector 130 mounted on a ring rotatable about one of the gudgeons or trunnions 122. Arms 131 and 132 and link 133 maintain a fixed angular relation between the antenna assembly and potentiometer sector 130.

As will be noted, the axes X, Y and Z do not intersect at a common point as is customary in gimbal or Cardan suspensions, but the intersection of the pair X, Y is spaced from the intersection of the pair X, Z. This feature is of importance in view of the necessity for accommodating a jointed micro-wave pipe, such form of conductor being necessary in the wave length range utilized by the radar equipment. The micro-wave pipe from the radar apparatus attaches to the stationary joint member 134 located above the post E, and which cooperates with rotating joint member 135. The latter is attached to the pipe connection 136 which terminates in a joint member 137 (Figure 3), stationary with respect to the block 115, and which cooperates with rotatable joint member 138. Angular pipe section 139, attached to the latter joint member, terminates in a joint member 140 stationary with respect to the H-frame D and cooperating with a joint member 141 to which is affixed the shaft of the feed horn A and which is rotatable with the antenna unit, being supported thereon by the member 142.

The three micro-wave pipe joints 134—135, 137—138 and 140—141 are thus arranged upon the respective axes Z, X, Y with their axes of rotation coincident therewith, but are spaced from the intersections of the axes in pairs, thus making provision for the necessary mechanical movements.

The radar apparatus, connected to the antenna by means of the micro-wave pipe, forms no part of the present invention. It will be understood, however, that it will comprise suitable visual indicators, such as oscilloscope screens, or suitable automatic apparatus, for indicating the target coordinates or for controlling the antenna movements in accordance with such indications.

The antenna frame structure B, previously referred to, comprises a triangular frame 143 (Figures 4, 5 and 6) which carries three rotatable cranks 144 and the antenna reflector C is carried on the crank pins 145 of these cranks. One of the cranks 144 is driven by scanning motor 146 and since each pair of cranks constitutes a parallel motion device, the antenna reflector C is thus caused to execute a parallel crank movement or circular translatory movement in which each point moves in a small circle having a radius equal to the crank radius or distance from the crank axis of rotation to the crank pin axis. This type of scanning movement is advantageous since it minimizes the gyroscopic resistance of the reflector by comparison with other expedients such, for example, as a rotating eccentric reflector. Gyroscopic effect due to reflector rotation may be considerable since the mass and radius of gyration of the reflector are considerable and the speed of scanning rotation may be relatively high. In the embodiment illustrated, this speed is approximately 2000 R. P. M. Gyroscopic effect due to reflector rotation will tend to cause precession and the resulting torque will place additional load upon the azimuth gyro and other stabilizing and control members, decreasing the efficiency of the apparatus or adding to the bulk and weight of the installation. For example, when the antenna is tilted downwardly about the Y axis, it will attempt to precess about the Z axis, generating a torque which must be overcome by the azimuth gyro. The conical scanning arrangement of the invention reduces this undesirable effect to a minimum, gyroscopic resistance being reduced in the proportion which the square of the crank radius bears to the square of the radius of gyration of the reflector about the X axis.

To reduce tendency to vibration, the antenna is dynamically counterbalanced by means of weights 147 and 148 associated with the cranks 144. The weights and proportions of these weights are selected so that the forces on each of the crank shafts are balanced about the crank shaft axis and are also balanced lengthwise of the crank bearings. All bearing reactions are accordingly reduced to a minimum and tendency of rotation of the reflector to vibrate the frame structure B is reduced to a minimum.

The apparatus of Figures 2 to 6, as described above, may be utilized with any of numerous control and operating devices, one suitable control circuit arrangement being shown in Figure 7 of the drawing. As there shown, the equipment comprises an A. C. follow up circuit for the control of the antenna in elevation (about axis Y). "Autosyn" or similar control circuits may also be employed, or D. C. control may be used, where preferred. The vertical gyro potentiometer sector 130, previously referred to, is connected across one half of a split secondary of the transformer T and a second potentiometer resistor 150 is connected across the other half of the same secondary. The brushes 129 and 151 of these two potentiometers are connected through equal resistors 152 and 153 to an input connection 154 of a phase sensitive amplifier indicated at 155 and the other input connection 156 of this amplifier is connected to the center tap of the transformer secondary, previously referred to. The output of amplifier 155 is connected to a two way relay 157 by means of which the servo driving the worm of gearing 126 (Figure 2) may be controlled. When brushes 129 and 151 are in corresponding position on their resistor sectors 130 and 150, their voltages will be equal and opposite in sign and input 154 will be at center tap potential, giving null input into the amplifier 155, so that the servo controlled by the output thereof will be stationary. If the brushes 129 and 151 are not at corresponding positions along their resistor sectors, the resultant voltage in the input 154 will be of a value corresponding to the unbalance between the brushes and will agree in phase with the brush which is further from the center tap end of its potentiometer. Accordingly, the relay 157 will be operated so as to cause the servo to rotate the antenna assembly about the Y axis and thus, through arms and link 131—133, rebalancing potentiometer 129, 130 with potentiometer 150, 151. The potentiometer 150—151 may be controlled in any convenient manner and in particular may be controlled by coupling it to any bomb sight computor part designed for rotating the telescope or mirror of an optical sight in elevation. In such case, as will be apparent to those skilled in the art, the control of elevation angle of the antenna in Figures 2 and 9 through the electric circuit and servo motor will be identical in effect with direct mechanical control of an optical sight.

The circuits of Figure 7 include also control means for regulating the antenna position about the cross-level axis X. In this case, the phase sensitive amplifier 158 and relay output 159 operate the servo having output gear 117 (Figure 3) so as to rock the H-frame D and parts carried thereby. The circuit comprises a second split secondary of the transformer T, potentiometer 123—124 associated with the vertical gyro F, and previously referred to, a potentiometer 160—161, within the housing 109 (Figures 2 and 3) and equal resistors 162 and 163, and to this extent is similar to the level axis control system previously described. The connection from resistor 163, however, is not made directly to the brush 161, but is made through brush 164 to a variable point along potentiometer 165 which is connected across the brush 161 and a quarter tap 166 of the transformer secondary. A center tap 167 of the potentiometer 160 is likewise connected to the quarter tap 166. Potentiometer 160 is wound to have a resistance proportional to the sine of the arc measured from center tap 167, and hence the voltage of brush 161 is a measure of the sine of the drift angle. Since the ends and center of potentiometer sector 160 are tied down to the taps of the transformer secondary, variation in voltage distribution along the sector 160 due to current drain by potentiometer sector 165 is minimized. Resistors 162 and 163 may be of high enough value to make the effects of current drain thereby negligible. One end of sector 165 being at the voltage of brush 161 and the other at the voltage of tap 167, which latter voltage is taken as the reference voltage, the voltage of brush 164 will be proportional to the setting of this brush multiplied by the movement of brush 161 from center tap 167. Therefore, if the trail be set in by potentiometer 164—165, the voltage of brush 166 will be proportional to the trail multiplied by the sine of the drift angle. The system operating to bring brush 124 to a position balancing brush 164, will thus rock the H-frame D through a corresponding angle.

Regulation of the antenna in azimuth is provided for by circuits controlled by turn control knob 170 and drift control knob 171, the former being utilized for the purpose of turning both the aircraft and the antenna, and the latter for the purpose of turning only the aircraft. Where cross wind or a transverse component of target motion are invloved, the maintenance of a collision course involves, as pointed out above, the establishment of a correct drift angle, and the turn knob 170 and drift knob 171 are utilized for this purpose.

Potentiometer 114, previously referred to (Figure 3), is a three tap 360° potentiometer having a pair of brushes spaced 180° apart and connected across voltage source 172. Rotation of the gear 112 relative to the main frame H (which corresponds to a change in azimuth of the antenna relative to the aircraft) will cause the brushes of potentiometer 114 to move around the resistance ring, thus varying the voltage distribution. A similar three tap 360° potentiometer 173 has its taps connected to those of the potentiometer 114 and its brushes connected to a meter 174 which serves as a pilot director indicator. The brushes of potentiometer 173 will furnish a zero indication when approximately 90° out of phase with the brushes of potentiometer 114. Where the position of these brushes is varied in either direction, a corresponding indication will be set up in the meter 174, so that if the airplane is controlled by a pilot to maintain a zero reading on the indicator 174, the aircraft will be turned relative to the azimuth stabilized antenna through an angle controlled by potentiometer 173. To reduce errors inherent in potentiometer systems of this character to negligible values, the potentiometer 114 is geared to the gear 112 so as to make a complete revolution in response to a turn of this gear through a fairly small angle. The knob 171 is connected to potentiometer 173 through gearing which drives the shaft 175 and this gearing may have any convenient ratio. A complete rotation of shaft 175 will correspond to any aircraft turn through an angle of, say 10°, or whatever other angle may be determined by the gear ratios.

The effect of turning knob 170 is to turn the aircraft and antenna as a unit so that when the turn is completed the antenna occupies the same azimuthal relation to the aircraft as when the turn was commenced. This is accomplished by means of potentiometer 108, previously referred to, potentiometer 176, controllable through shaft 177 by the knob 170, and relay 178 which controls the servo 106. The connections in this circuit being identical with those just described except for the substitution of the relay 178 for the pilot director indicator 174, this portion of the circuit requires no further description. In operation, turning the knob 170 will unbalance potentiometer 176 thus energizing the relay 178 and causing the servo 106 to turn the antenna around the yaw axis Z until potentiometer 108 balances potentiometer 176. This movement, however, is communicated through sector 113 and gear 112 to potentiometer 114, thus unbalancing potentiometer 173 and signaling a turn on the pilot director indicator 174. Accordingly, the pilot in maintaining a zero indication in this indicator will cause the aircraft to follow the antenna so that the net result will be to turn both the aircraft and the antenna through the same angle. Accordingly, utilization of the knob 170 to keep the aircraft and antenna pointed at the target will maintain a homing course as described above. Where knobs 170 and 171 are grasped together and turned as a unit through a given angle, the effect will be to cause, through potentiometer 176, a turn of both aircraft and antenna through a certain angle and to cause, through potentiometer 173, a turn of the aircraft alone through a certain angle. The relation between these angles is determined by the gear ratios and the net effect of turning both knobs simultaneously is to establish a proportion between aircraft turn and antenna turn in response to a deviation from desired course, thus establishing a navigation course or collision course in the manner described above. Where smaller ratios of aircraft turn to antenna turn than that provided by turning the knobs 170 and 171 as a unit are desired, knob 171 may be permitted to slip.

In connection with the embodiment of Figures 2 to 7, the radar equipment, which in itself forms no part of the present invention has not been illustrated or described. It will be understood, however, that the information obtained therefrom is utilized just as in the case of an optical bomb sight to keep the antenna pointed at the target and may also be utilized to provide altitude, slant range or elevation and drift indications to be set into a computor.

The invention provides for a novel method of navigation which is particularly applicable to bombing runs, where it may be desirable for evasive reasons to commence a run on a homing course and then to shift suddenly to a navigation course. This method of approach comprises selecting a range from the target at which it is desired to change to a navigation course and then measuring the angular movement of the aircraft in maintaining a homing course between a predetermined greater range and the selected range. In the embodiment of Figure 1, this is accomplished in the following steps: first, a homing course is established; second, while the homing course is still being maintained, the drift potentiometer shaft 31 is clutched in but the potentiometers are not connected in the bridge circuit; third, the run is continued on such homing course to a predetermined point where the directing meter or indicator M is switched into the circuit with the drift potentiometers. This meter will now indicate a turn to be made, which turn is made in one step and will place the aircraft substantially on a navigation course. As can be demonstrated by computation from the assumed data, the relationship between the range at which the drift potentiometers are clutched in and the range at which the aircraft is turned to bring it into the navigation course is a simple one, the natural logarithm of the ratio of the two ranges being equal to the reciprocal of $(N-1)$, where N is the ratio between the turn called for on a navigation course and that called for on a homing course. The utility of this method in the preferred form consists in its extreme simplicity in operation, since the angle of turn to be made in shifting to a navigation course may be read directly off the meter, and secondly, in the rapid attainment of a navigation course without need for a high ratio (N) between aircraft turn and antenna turn.

When it is desired to bring the aircraft into its navigation course at a range having other than the above indicated relation to the range at which the drift potentiometers are clutched in, provision may be made therefor by suitable meter calibration or computation of called for turn. The method may also be carried out with relation to the elapsed time and air speed instead of with relation to range or other distance measurement.

In the embodiment of Figures 2 to 7, a similar method of navigation may be employed by turning only the knob 170 between the first and second ranges, then rapidly turning knob 171 through an equal angle, and thereafter turning both knobs together.

What is claimed is:

1. In a device for stabilization of radar antennas and the like, and in combination, an antenna support and means for rotating the said support in azimuth comprising a servo input, an azimuth stabilized input, means for adding the two inputs and an output controlling rotary movement of said support according to the added inputs.

2. A device according to claim 1, comprising aircraft control means responsive to said servo input for signalling aircraft turn through an angle proportional to servo movement and adjustment means for selecting one of a plurality of different ratios of aircraft turn to servo movement.

3. In a device for stabilization of radar antennas and the like, and in combination, an antenna support, servo means for rotating said support, aircraft turn control mechanism also operable by said servo means, centering means responsive to said aircraft turn control mechanism for actuating said servo means to center said turn control mechanism, and further centering means responsive to rotation of said antenna support for superposing upon movement of said servo means a further rotary movement for centering said support.

4. In a device for stabilization of radar antennas and the like, and in combination, an antenna turn control member, an aircraft turn control member, servo means for rotating both said members and including a differential gear therebetween, and centering means for the said members comprising servo operating means responsive to the angular positions of the said members for actuating said servo means to rotate one of said elements to center the same, while simultaneously rotating an element of said differential gear, and further servo means actuated by said operating means for rotating another element of the said differential gear to impart to the other of the said members a rotation corresponding to the added movements of both said servo means.

5. In a device for stabilization of radar antennas and the like, and in combination, an antenna support mounted for rotation about an axis fixed with relation to an aircraft and means for rotating the said support in azimuth comprising a differential gear having a servo input, an input stabilized in azimuth in a platform normal to the said axis and an output controlling rotary movement of said support.

6. The method of navigating aircraft by means of radar or the like directional devices which comprises establishing a homing course, cumulating the aircraft turn which would be required by a predetermined drift-turn ratio greater than unity, during a run on said homing course from a selected range to a second selected range, computing from the said cumulated aircraft turn the amount of turn required to bring the aircraft into a collision or navigation course, making the required turn, and thereafter operating the aircraft with a drift-turn ratio greater than unity to establish and maintain a collision or navigation course.

7. The method of navigating aircraft by means of radar or the like directional devices which comprises establishing a homing course, cumulating the aircraft turn which would be required by a drift-turn ratio N, greater than unity, during a run on said homing course from a selected range to a second selected range, the natural logarithm of the ratio of the two said ranges being equal to the reciprocal of $(N-1)$, making the said cumulated aircraft turn at the said second selected range, and thereafter operating the aircraft with a drift-turn ratio greater than unity to establish and maintain a collision or navigation course.

8. A device for the stabilization of radiant energy antennae, including in combination an antenna, means for supporting said antenna, means for rotating said support in azimuth to maintain the antenna aligned with a predetermined bearing, means for turning an aircraft through an angle having a predetermined ratio to the angle of rotation of said antenna, means for modifying the action of said aircraft-turning means to turn the aircraft through an angle having a greater ratio to the angle of rotation of said antenna than said predetermined ratio, means for selectively operating said action-modifying means, and means operable during the action of said aircraft-turning means for cumulating a signal which is a function of the amount of aircraft turn which would be produced by said modifying means if said modifying means were in operation.

9. A device as in claim 8 in which the predetermined ratio of the angle of rotation of said antenna to the angle of turn of the aircraft is unity and said greater ratio is a multiple N of said first ratio, the construction being such that the amount of aircraft turn at the end of a run equals the cumulative turn which would have been produced by said modifying means if the ratios at the beginning and end of the run were such that the natural logarithm of their ratio is the reciprocal of $(N-1)$.

CARL L. NORDEN.

REFERENCES CITED

The following references are of record in the file of this patent:

UNITED STATES PATENTS

| Number | Name | Date |
|---|---|---|
| 2,051,974 | Warner | Aug. 25, 1936 |
| 2,158,584 | Koster | May 16, 1939 |
| 2,199,402 | Hegenberger | May 7, 1940 |
| 2,201,174 | Harding et al. | May 21, 1940 |
| 2,207,709 | Bates | July 16, 1940 |
| 2,288,102 | Meredith | June 30, 1942 |
| 2,407,275 | Hays, Jr. | Sept. 10, 1946 |
| 2,408,825 | Varian et al. | Oct. 8, 1946 |
| 2,410,831 | Maybarduk et al. | Nov. 12, 1946 |
| 2,414,108 | Knowles et al. | Jan. 14, 1947 |
| 2,419,970 | Roe et al. | May 6, 1947 |
| 2,420,016 | Sanders | May 6, 1947 |
| 2,420,017 | Sanders | May 6, 1947 |